Figure 1:
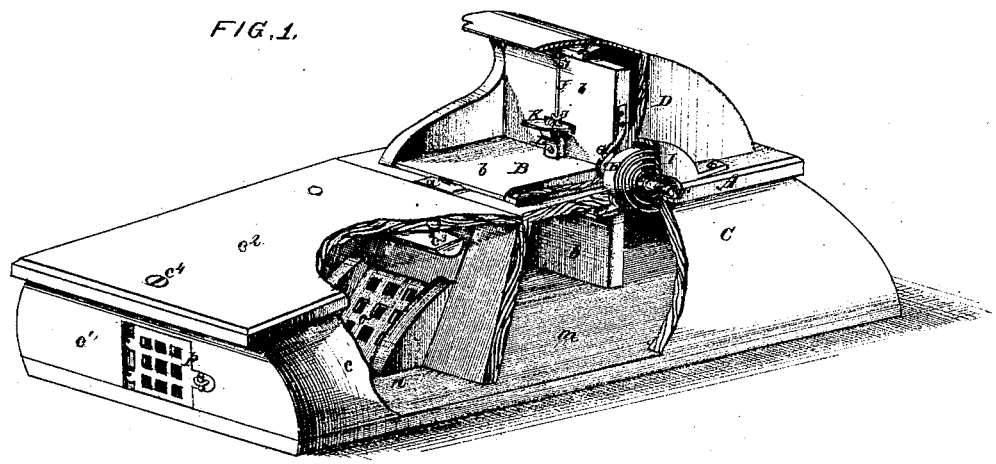
Figure 4:
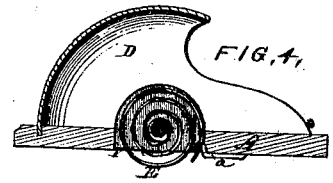
Figure 3:
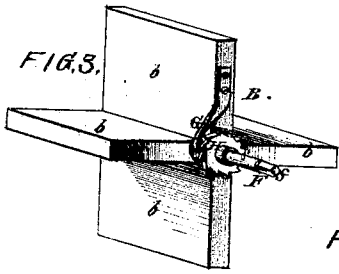
Figure 2:
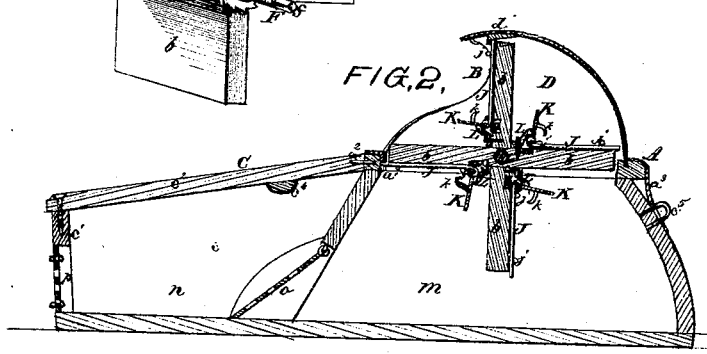

W. J. Clarkson,

Cage Trap.

No. 99,293.  Patented Feb. 1, 1870.

Witnesses
W. B. Deming
Jas. Lewin

W. J. Clarkson
by Knight Bro
Attorneys

United States Patent Office.

W. J. CLARKSON, OF GOURDIN'S DEPOT, NORTH-EASTERN RAILROAD, SOUTH CAROLINA.

Letters Patent No. 99,293, dated February 1, 1870.

IMPROVED ANIMAL-TRAP.

The Schedule referred to in these Letters Patent and making part of the same.

I, W. J. CLARKSON, of Gourdin's Depot, North-Eastern Railroad, in the State of South Carolina, have invented an Improved Animal-Trap, which I denominate "The Surprise Trap."

Nature and Objects.

My improved trap has, over a suitable receptacle, a rotary wheel, into which the animal has to pass to get at the bait, and which, on the bait being tugged at, by the retraction of a stop thereby, is released, and under the pressure of a suitably-applied spring, rotates, depositing the animal into the receptacle, and resetting itself.

The improvement consists in certain constructions and combinations of parts, hereinafter set forth, securing superior simplicity and ease of operation.

General Description.

The platform or frame A, of the wheel B, is made of such form and dimensions as to rest over the mouth of the particular form of receptacle C, for which intended.

It is provided with a shield, D, to prevent access to the wheel, except at the proper point.

A spring, E, attached, at one end, by a hook, $a$, or its equivalent, to the platform A, or a fixed accessory of said platform, and, at its other, to a shaft, F, serves, in conjunction with a pawl and ratchet, G H, connecting said shaft to the wheel, as a means for storing power to propel said wheel when it is released.

A shield, I, concentric with the shield D, of the wheel B, may protect said spring.

A projecting square or similarly-formed end $f$, of the spring-shaft F, enables a key to be applied to it, to wind the spring.

The wheel B consists of four radial wings $b$, suitably connected.

Each of said wings is provided, centrally, on its front or under side, with a radial bolt, J, working in suitable guides, $j$. Said bolts serve to lock the wheel against forward and retrograde movement, when the trap is set, catches or stops, $a^1 d'$, being provided on the platform A and wheel-shield D for the engagement of two of them, when the wings on which they are, are in proper position for the purpose.

To enable said bolts J to be operated, they are connected at their inner ends to levers or treadles K, hinged to the wings $b$ of the wheel, behind said bolts, and pressed upward, by springs L, to project the bolts.

Hooks $k$, or their equivalent, on the treadles K, receive the baits.

The receptacle C, for small animals, may consist, as represented, of a wooden box, having the usual reception and prison-chambers $m\ n$, provided with doors $o\ p$, for the passage of the animals into the latter, and their removal therefrom, said doors being perforated or open, to decoy the animals through the former.

A convenient and superior manner of constructing such receptacle is represented. It consists in forming the receptacle with sides $c$, inclined inward, at their upper edges, and tapering, in height, to their rear ends, where they are secured to an end piece, $c^1$, of the same height as them, and with a top, $c^2$, provided with a cleat or cleats, $c^3$, for engagement under the projecting edges of the sides $c$, whereby it is enabled to be held by a single screw, $c^4$, or its equivalent, and thus to be readily removed, when desired.

The platform A, of the wheel, may be attached to such receptacle by projections or pins $a^2$, on its inner end, engaging with corresponding sockets in the top $c^2$, of the receptacle, and a hasp, $a^3$, on its outer end, engaging with a staple, $c^5$, on the receptacle.

The trap is very superior for catching game, where it is desirable to avoid injury to the fur, and also, when employed about a house or farm, where domestic animals are liable to get into it, as it does not injure the animals in the least.

The trap may be employed for catching animals of any description for which adapted, and its size, and the material of which its several parts are composed, will vary accordingly.

Operation.

The operation of the trap, as represented, is as follows:

The wheel B, being set over the receptacle, and previously or subsequently baited, by fixing a bait on each of the treadles K, by means of their hooks $k$, the spring E is wound up, by applying a key to the square end $f$, of its shaft F, the wheel being held from rotation by one of its bolts J, engaging with the stop $a^1$ on its platform. The trap is then "set."

The shield D compels the animals to enter at the front side of the wheel. Advancing to take the exposed bait, they are brought within the wheel, and, on touching the bait, the bolt J, with which the bait is connected, is retracted through the treadle K, on which the bait is secured, and the wheel, being thereby released, is rotated by the spring E, depositing the animal into the receptacle C.

The bolt J, by the retraction of which the wheel was released, being advanced again, by its spring L, engages behind the stop $a^1$, on the platform A, and prevents the wheel being turned by the animal in its endeavors to escape. The next bolt J, in the circumference of the wheel, being brought against the stop $d'$, on the shield D, the wheel is again set.

The animal, finding itself enclosed in the chamber $m$, of the receptacle C, and attracted by the light admitted by the door $o$, will be led to exert itself thereagainst. Opening to pressure, said door will permit its ingress into the prison-chamber $n$, where it is confined, the door $o$ yielding only in the opposite direction.

To remove the animals, the door $p$ is opened, or the top $a^2$ removed.

*Claim.*

I claim, as new—

The trapping-appliance, composed of the wheel B, shield D, spring E, spring-shaft F $f'$, pawl and ratchet G H, and locking and tripping-devices J K $k$ L $a^1$ $d'$, mounted in a platform A, detachable and removable from the receptacle C, and constructed and arranged as represented and described, for the purpose set forth.

W. J. CLARKSON.

Witnesses:
C. M. MATTHEWS,
N. B. CLARKSON.